(12) United States Patent
Hsu et al.

(10) Patent No.: US 7,410,734 B2
(45) Date of Patent: Aug. 12, 2008

(54) METHOD OF FABRICATING COLOR FILTER

(75) Inventors: Feng-Lin Hsu, Taipei (TW); Huai-An Li, Taoyuan County (TW); Yu-Cheng Lo, Taipei (TW); Jiun-Ming Wang, Changhua County (TW); Yu-Hsien Chen, Kaohsiung (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 435 days.

(21) Appl. No.: 11/161,991

(22) Filed: Aug. 25, 2005

(65) Prior Publication Data

US 2007/0048633 A1    Mar. 1, 2007

(51) Int. Cl.
G02B 5/20 (2006.01)
G02F 1/1335 (2006.01)

(52) U.S. Cl. .......................... 430/7; 427/162; 427/259; 427/282; 347/106

(58) Field of Classification Search ........................ None
See application file for complete search history.

(56) References Cited

U.S. PATENT DOCUMENTS 5,691,011 A * 11/1997 Newsham et al. .......... 428/1.31
5,908,721 A * 6/1999 Emoto et al. ................... 430/7
2005/0248699 A1* 11/2005 Li et al. ...................... 349/106

FOREIGN PATENT DOCUMENTS

| JP | 04-123007 | 4/1992 |
| JP | 08-292313 | 11/1996 |
| JP | 09-230127 | 9/1997 |
| JP | 10-104415 | 4/1998 |
| JP | 2000-221485 | 8/2000 |

* cited by examiner

Primary Examiner—John A. McPherson
(74) Attorney, Agent, or Firm—Jianq Chyun IP Office

(57) ABSTRACT

A method of fabricating a color filter is provided. First, a substrate having a light shielding layer formed thereon is provided, wherein the light shielding layer is adopted for defining a plurality of sub-pixel regions on the substrate. Next, a hydrophobic layer is formed on the light shielding layer by stencil printing, or a surface silylation treatment is carried out to clean the light shielding layer by inkjet printing. Next, a color filter layer is formed in the sub-pixel regions. Thus, fabrication method of the present invention is capable of reducing the possibility of intermixing the color ink between adjacent sub-pixel regions.

9 Claims, 5 Drawing Sheets

METHOD OF FABRICATING COLOR FILTER

BACKGROUND OF THE INVENTION

1. Field of the Invention

The present invention generally relates to a method of fabricating a color filter. More particularly, the present invention relates to a method of fabricating a color filter, wherein the possibility of intermixing between the color inks in adjacent sub-pixel regions can be substantially reduced.

2. Description of Related Art

As the development of the performance of computer, internet, and multimedia technology, the transformation of image information has gradually progressed from analog information to digital information. In recent years, the size and weight of many electronic device has gradually reduced to produce thinner and lighter electronic products. As to a display device, although the conventional cathode ray tube (CRT) display is widely used, however, it has the disadvantages of large size, high radiation, heavy weight and high power consumption. Therefore, the flat panel display (FPD), which has the advantages of being thinner, flatter, lighter, low or radiation free, and low power consumption, has gradually become the mainstream of display devices. The flat panel display (FPD) includes, for example, liquid crystal display (LCD), organic light emitting display (OLED) or plasma display panel (PDP).

A conventional liquid crystal display (LCD) consists mainly of a thin film transistor (TFT) array, a color filter, and a liquid crystal layer disposed between the thin film transistor array and the color filter. The color display of the liquid crystal display is generally performed by color filters. The color filter is generally constructed over a transparent glass substrate. The color filter generally comprises a black matrix and a color filter layer comprising, for example, red filter units, green filter units and blue filter units arranged corresponding to each sub-pixel, wherein the black matrix is adopted for shield light.

A fabrication method for forming a color filter layer by inkjet printing has been developed recently. According to this conventional fabrication method, first, a black matrix is formed on a substrate to define a plurality of sub-pixel regions. An inkjet printing process is then performed to inject color ink (red, green, or blue) into the sub-pixel regions defined by the black matrix. Next, a thermal baking process may be performed to solidify the color ink.

The above conventional fabrication method, however, has some shortcomings, such as, during the injection of color ink into the sub-pixel regions between patterns of the black matrix, the level of color ink in each of sub-pixel areas is often higher than the surface of the black matrix since the volume of the color ink injected is usually a little larger than that defined by the sub-pixel areas. Therefore, the problem of intermixing of the color inks in adjacent sub-pixel regions may occur if the inkjet printing process is not properly controlled.

In order to resolve the above problem, a hydrophobic film is formed on the black matrix before forming the color filtering layer using a plasma process. However, instead of obtaining an expected flat hydrophobic film, usually a black matrix film with island structures formed thereon is obtained due to variation in the processing recipe, resulting in overflow of color inks and intermixing color inks. Furthermore, the hazardous $CF_4$ gas used in the plasma process is also a grave safety concern.

In addition, another conventional method, disclosed in Japanese Patent Publication No. 09230127, includes coating a 25% $C_8F_{17}C_2H_4$—Si—$(OCH_3)_3$/methanol solution over the substrate and etching using a solution comprising 1% Buffer Fluoric acid (50% HF:40% NH4F). Thereafter, a color filter layer is formed in the sub-pixel regions. Since the 25% $C_8F_{17}C_2H_4$—Si—$(OCH_3)_3$/methanol solution is coated over the entire substrate, the surface of the substrate in the sub-pixel regions may still have hydrophobic property even though a cleaning process is being performed thereafter, and the problem of intermixing of the color inks in adjacent sub-pixel regions still occurs. Besides, the entire process time is longer than 8 hours, and the use of HF acid is of a grave safety concern.

SUMMARY OF THE INVENTION

Accordingly, the present invention provides a method of fabricating a color filter, in which the possibility of intermixing between the color inks in adjacent sub-pixel regions can be substantially reduced.

According to an embodiment of the present invention, first, a substrate having a light shielding layer formed thereon is provided, wherein the light shielding layer defines a plurality of sub-pixel regions on the substrate. Next, a hydrophobic layer is formed on the light shielding layer by stencil printing. Next, a color filter layer is formed in the sub-pixel regions.

According to an embodiment of the present invention, the stencil printing process mentioned above comprises a step of providing a stencil over the substrate for covering the sub-pixel regions such that the light shielding layer is exposed. Next, a liquid-state hydrophobic material is filled onto the exposed light shielding layer. Next, the liquid-state hydrophobic material is solidified to form the hydrophobic layer. Thereafter, the stencil is removed from the substrate.

According to an embodiment of the present invention, the hydrophobic layer mentioned above comprises Paraffin.

According to an embodiment of the present invention, the hydrophobic layer is removed after the step of forming the color filter layer.

According to an embodiment of the present invention, the hydrophobic layer mentioned above can be removed by treating, for example, with a solution comprising ether.

According to an embodiment of the present invention, the color filter layer is formed by performing an inkjet printing process or a photolithography process.

According to an embodiment of the present invention, the light shielding layer may be a black matrix. Wherein, the material constituting the black matrix is, for example, epoxy resin.

The method of fabricating a color filter, according to another embodiment of the present invention, comprises providing a substrate having a light shielding layer formed thereon, wherein the light shielding layer defines a plurality of sub-pixel regions on the substrate. Next, a surface silylation treatment is performed on the light shielding layer by inkjet printing. Next, a color filter layer is formed in the sub-pixel regions.

According to an embodiment of the present invention, the light shielding layer may be a black matrix. Wherein, the material constituting the black matrix is, for example, epoxy resin.

According to an embodiment of the present invention, the surface silylation treatment comprises coating a silylate material having formula, 2X—Si—2Y. Wherein, X is a halogen atom, and Y is a hydrophobic group. For example, the silylate material comprises Dimethyldichlorosilane (DM-DCS).

According to an embodiment of the present invention, a cleaning process is performed for cleaning the light shielding layer after the step of performing the surface silylation treatment but before the step of forming the color filter layer.

According to an embodiment of the present invention, the cleaning process mentioned above is accomplished using a solution, for example, comprising methanol.

According to an embodiment of the present invention, the color filter layer is formed by performing an inkjet printing process or a photolithography process.

Since a hydrophobic layer formed by stencil printing or a surface silylation treatment performed by inkjet printing for cleaning the light shielding layer before forming the color filter layer, the possibility of intermixing between the color inks in adjacent sub-pixel regions can be effectively reduced. Thus, the process yield can be effectively promoted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
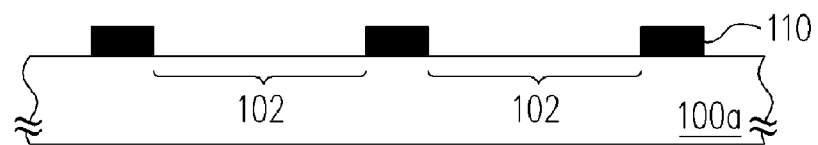
FIG. 1A through 1G are schematic cross-sectional views illustrating a process of fabricating a color filter according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A through 1G are schematic cross-sectional views illustrating a process of fabricating a color filter according to an embodiment of the present invention.

First, referring to FIG. 1A, a substrate 100a is provided, wherein the substrate 100a is, for example, a glass substrate having high transmittance. Next, a light shielding layer, such as a black matrix 110, is disposed on the substrate 100a, wherein the black matrix defines a plurality of sub-pixel regions 102 on the substrate 100a. Wherein, the material constituting the black matrix 110 is, for example, epoxy resin, or some other materials with good light-shielding property and low reflectivity. According to an embodiment, the method for forming the black matrix 110 includes forming a photo-sensitive resin layer (not shown) on the substrate 100a by spin coating. Next, the photo-sensitive resin layer is patterned by using the conventional photolithography to form the black matrix 110. The function of the black matrix 110 is mainly to effectively separate different colors of the emitted light so as to increase the purity of the displayed colors.

Figure 1B:
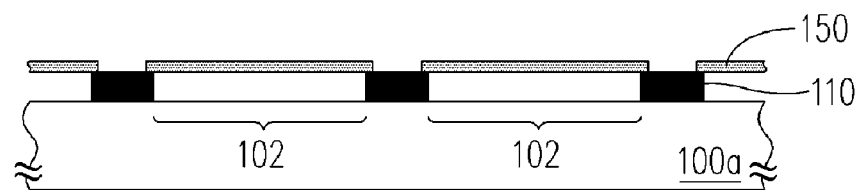
Figure 1C:
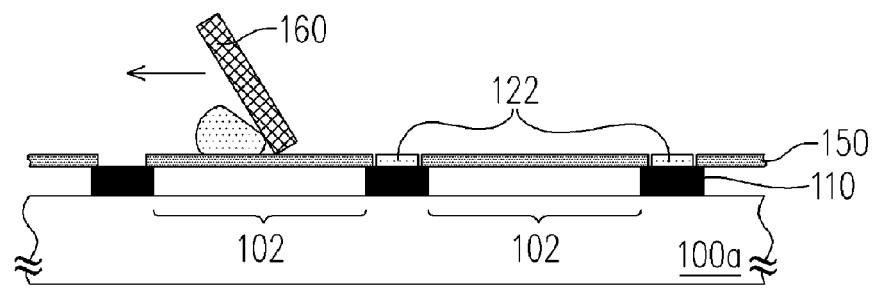
Figure 1D:
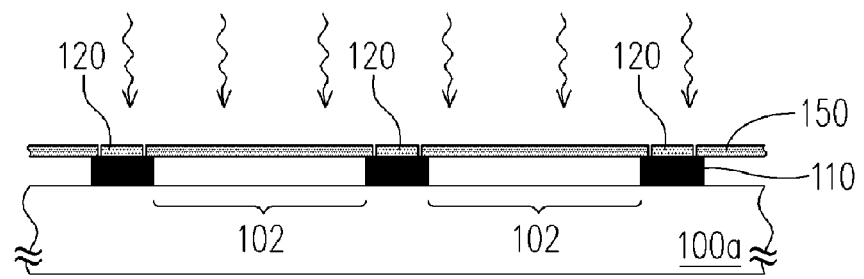
Figure 1E:
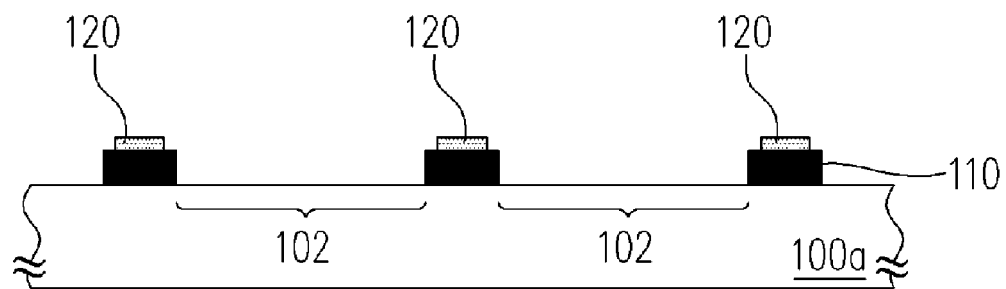

Next, referring to FIG. 1B through 1E, a stencil printing process is performed to form a hydrophobic layer 120 on the black matrix 110. As shown in FIG. 1B, a stencil 150 is disposed over the substrate 100a for covering the sub-pixel regions 102 such that the black matrix 110 is exposed. Next, as shown in FIG. 1C, a liquid hydrophobic material 122 is filled onto the top surface of the black matrix 110 by using a scraper 160, wherein the liquid hydrophobic material, for example, is a liquid paraffin. Thereafter, as shown in FIG. 1D, the liquid hydrophobic material 122 is cooled to form the solid hydrophobic layer 120. Next, as shown in FIG. 1E, the stencil 150 is removed from the substrate 100a, and retaining the hydrophobic layer 120 covering the black matrix 110.

Figure 1F:
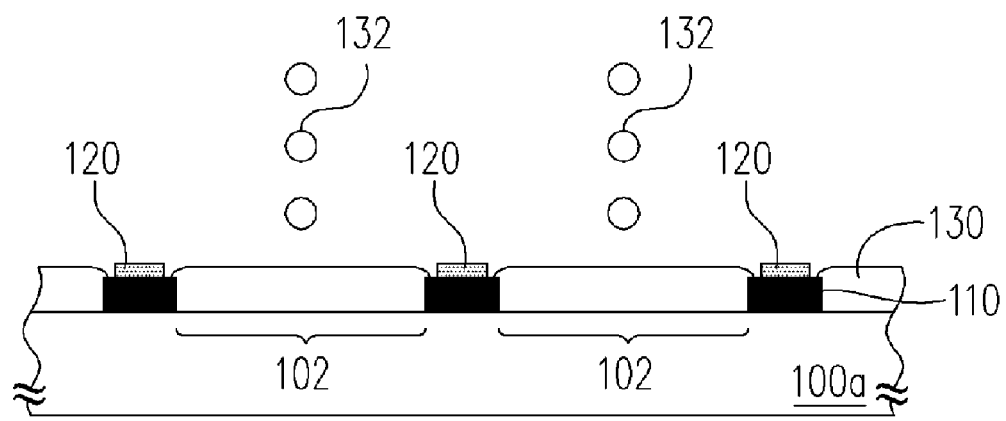

Next, referring to FIG. 1F, a color filter layer 130 is formed in the sub-pixel regions 102. As shown in FIG. 1F, an inkjet printing process or a photolithography process is performed to inject color ink 132 into the sub-pixel regions 102 defined by the black matrix 110. For example, the color ink 132 filled into the sub-pixel regions 102 includes red, green and blue ink. Thereafter, an exposing or drying process is performed to solidify the color ink 132 and thereby form the color filter layer 130 in the sub-pixel regions 102. The color filter layer 130, for example, comprises red filter units, green filter units and blue filter units arranged corresponding to each sub-pixel region 102.

Figure 1G:
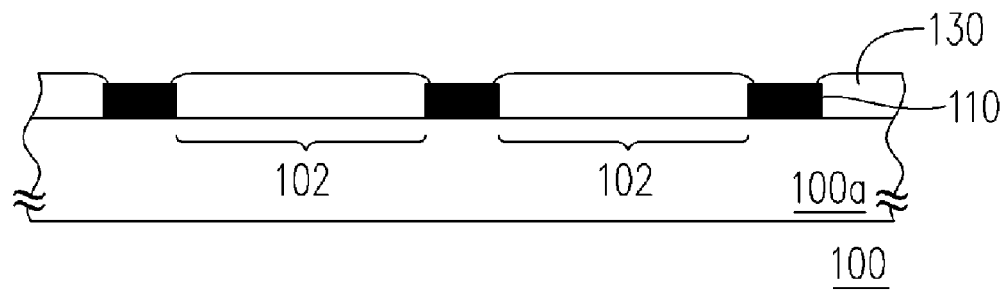

Thereafter, referring to FIG. 1G, the hydrophobic layer 120 can be removed by using a solution, such as ether. Subsequently, a cleaning process and a thermal baking process may be performed. Thus, the color filter 100 shown in FIG. 1G can be obtained according to the aforementioned fabricating process.

Accordingly, in the an embodiment mentioned above, a material, such as liquid paraffin having high hydrophobic property and low melting point (about 50° C. to 65° C.), is adopted to form a hydrophobic layer on the black matrix. It should be noted that the stencil printing process is performed for forming the hydrophobic layer, thus other regions beside the black matrix can be protected from the hydrophobic material. Moreover, the process is much simpler and inexpensive compared to the aforementioned conventional process.

FIGS. 2A through 2D are schematic cross-sectional views showing a process for fabricating a color filter according to another embodiment of the present invention.

Figure 2A:
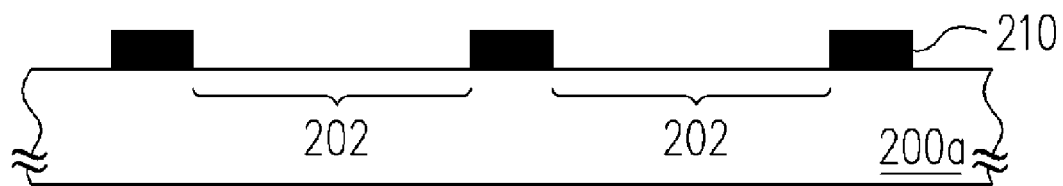
FIG. 2A through 2D are schematic cross-sectional views showing a process of fabricating a color filter according to another embodiment of the present invention.

As shown in FIG. 2A, a substrate 200a, having a light shielding layer (such as a black matrix 210) disposed thereon, is first provided, wherein the black matrix 210 is adopted for defining a plurality of sub-pixel regions 202 on the substrate 200a. Wherein, the material constituting the black matrix 210 is, for example, epoxy resin, or some other materials with good light-shielding property and low reflectivity. Because, the function and the fabrication process of the black matrix 210 is similar to those described in aforementioned embodiment, and therefore a detailed description thereof is not repeated.

Figure 2B:
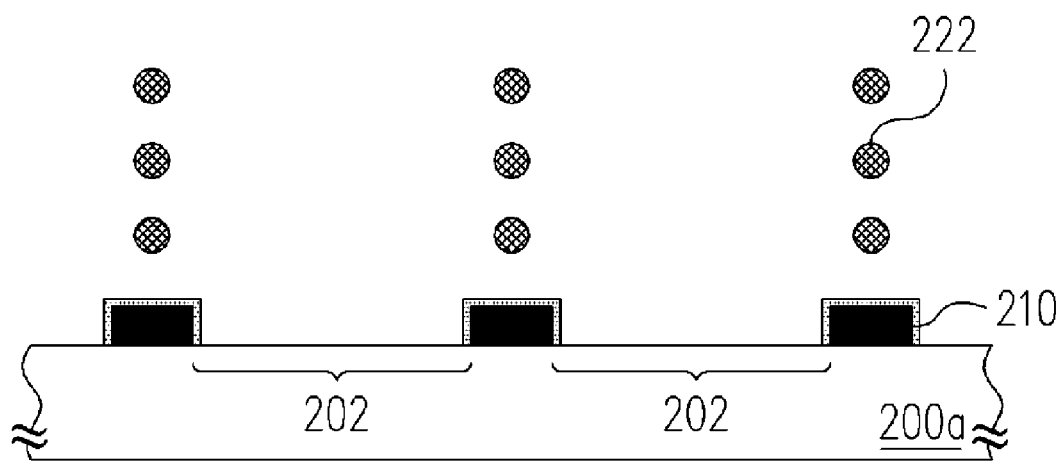
Figure 3:
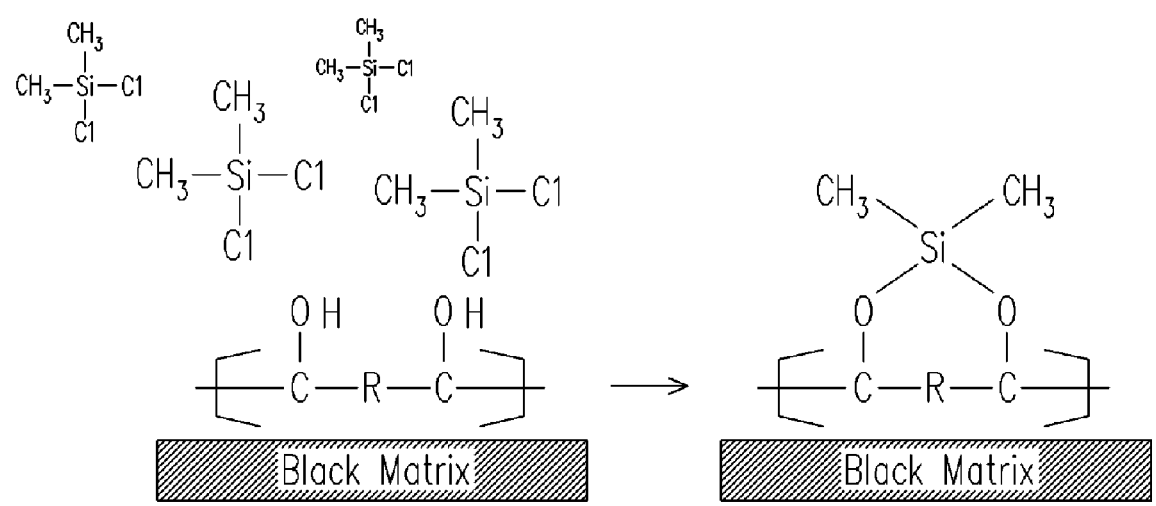
FIG. 3 illustrates the reaction between the dimethyldichlorosilane and the black matrix of epoxy resin during the silylation reaction.

Thereafter, as shown in FIG. 2B, a surface silylation treatment is carried out to clean the surface of the black matrix 210, wherein the silylation treatment includes inkjet printing. According to an embodiment of the present invention, the surface silylation treatment includes injecting a silylate material having a formula 2X—Si—2Y, wherein X is a halogen atom such as Cl, and Y is a hydrophobic group such as CH3. In a preferred embodiment, the silylation treatment may be carried out using a solution 222 comprising 20% dimethyldichlorosilane (DMDCS)/Toluene. FIG. 3 illustrates the reaction between the dimethyldichlorosilane and the black matrix 210 comprised of epoxy resin during the silylation reaction. As shown in FIG. 3, the —Cl of dimethyldichlorosilane reacts with the —OH of Epoxy resin to form a hydrophobic structure having —O—Si—$CH_3$ bonding on the surface of the black matrix 210.

Figure 2C:
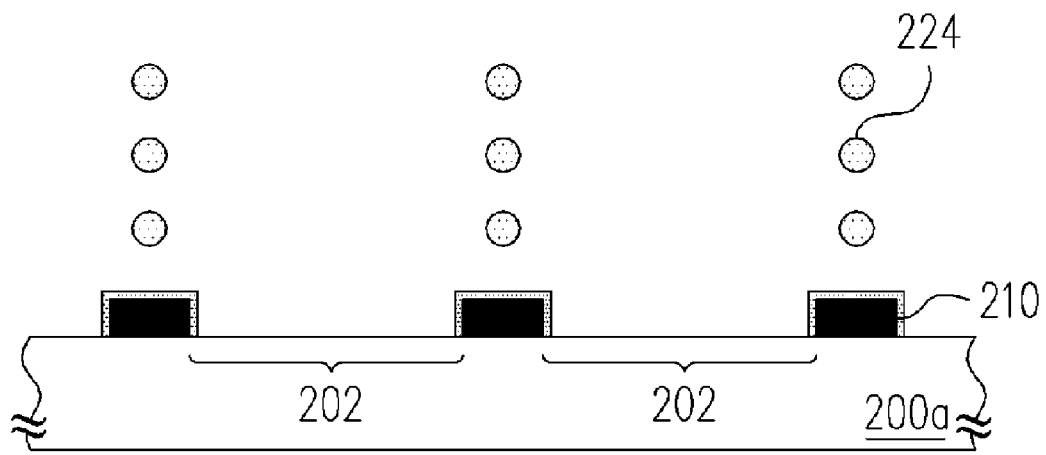

Next, as shown in FIG. 2C, a cleaning process may be carried out using a cleaning solution 224 comprising methanol, since methanol can replace unbonded —Cl of the dimethyldichlorosilane with —CH3. Thereafter, the residual cleaning solution 224 can be removed by an air knife (not shown).

Figure 2D:
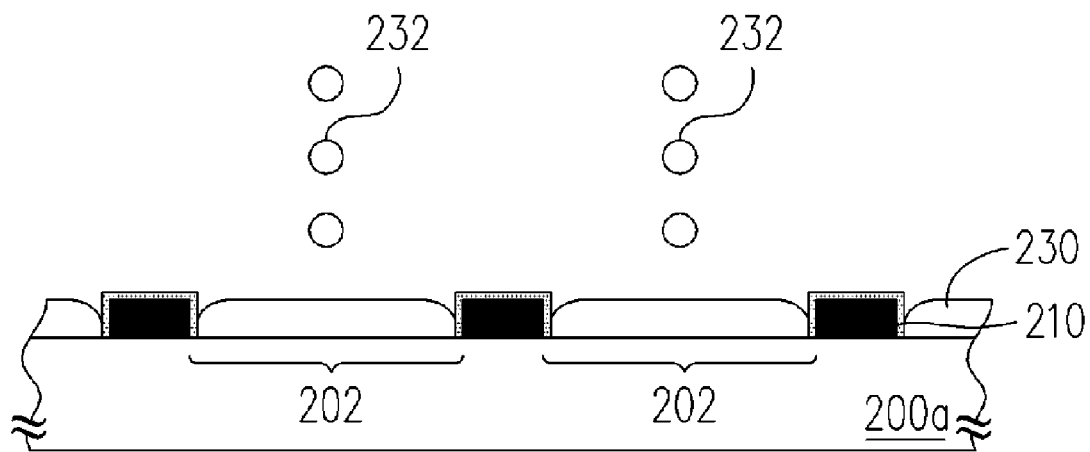

Next, as shown in FIG. 2D, a color filter layer 230 is formed in the sub-pixel regions 202 by an inkjet printing process or a photolithography process. For example, the color ink 232 includes red, green and blue ink. Next, a thermal baking process is performed to solidify the color ink 232 to form the color filter layer 230 in the sub-pixel regions 202.

Accordingly, in the preferred embodiment mentioned above, a silylation treatment is carried out on the black matrix by inkjet printing to modify the property of the black matrix. Since the silylation treatment is selectively carried out by inkjet printing only cleaning the surface of the black matrix, the properties of the sub-pixel regions will not be adversely affected by the silylation treatment. Furthermore, the possibility of color ink overflow and intermixing of color inks between adjacent sub-pixels can be effectively reduced. Besides, the inkjet printing process can also economize the use of the silylate materials.

It should be noted that even though the above embodiments describe the fabrication process of a color filter, one of ordinary skill in the art may well appreciate that the above method fabrication process may also be similarly applied in PLED (polymer light emitted diode) for modifying the property of the ITO layer, the well, the bank, or the hole through layer (HTL) etc.

In summary, the method of fabricating the color filter of the present invention including forming a hydrophobic layer over the surface of the black matrix or performing a silylation treatment to clean the surface of the black matrix for substantially reducing the possibility of intermixing of color ink between adjacent sub-pixel regions. Compared with the conventional art, the present invention provides a much safer and simpler process. Furthermore, the fabrication cost can be effectively reduced, and the fabrication yield can be effectively promoted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a color filter, comprising:
   providing a substrate having a light shielding layer disposed thereon, wherein the light shielding layer is adopted for defining a plurality of sub-pixel regions on the substrate;
   performing a stencil printing process to form a hydrophobic layer on the light shielding layer; and
   forming a color filter layer in the sub-pixel regions.

2. The method according to claim 1, wherein the stencil printing process comprises:
   providing a stencil over the substrate for covering the sub-pixel regions such that the light shielding layer is exposed;
   filling a liquid hydrophobic material onto the exposed light shielding layer;
   solidifying the liquid hydrophobic material to form a solid hydrophobic layer; and
   removing the stencil.

3. The method according to claim 1, wherein the hydrophobic layer comprises paraffin.

4. The method according to claim 1, further comprising removing the solid hydrophobic layer after forming the color filter layer.

5. The method according to claim 4, wherein the hydrophobic layer is removed by using a solution.

6. The method according to claim 5, wherein the solution comprises ether.

7. The method according to claim 1, wherein the color filter layer is formed by performing an inkjet printing process or a photolithography process.

8. The method according to claim 1 wherein the light shielding layer is a black matrix.

9. The method according to claim 8, wherein the black matrix comprises epoxy resin.

* * * * *